United States Patent
Van Thiel

(10) Patent No.: US 11,572,047 B2
(45) Date of Patent: Feb. 7, 2023

(54) ELECTROPNEUMATIC TRAILER SUPPLY MODULE FOR PROVIDING THE TRAILER SUPPLY PRESSURE

(71) Applicant: WABCO GmbH, Hannover (DE)

(72) Inventor: Julian Van Thiel, Großburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 338 days.

(21) Appl. No.: 16/631,463

(22) PCT Filed: May 29, 2018

(86) PCT No.: PCT/EP2018/064069
§ 371 (c)(1),
(2) Date: Jan. 16, 2020

(87) PCT Pub. No.: WO2019/034296
PCT Pub. Date: Feb. 21, 2019

(65) Prior Publication Data
US 2020/0207319 A1 Jul. 2, 2020

(30) Foreign Application Priority Data
Aug. 16, 2017 (DE) .................... 10 2017 007 781.9

(51) Int. Cl.
*B60T 13/40* (2006.01)
*B60T 13/68* (2006.01)
(Continued)

(52) U.S. Cl.
CPC ............ *B60T 13/403* (2013.01); *B60T 13/38* (2013.01); *B60T 13/385* (2013.01);
(Continued)

(58) Field of Classification Search
CPC ...... B60T 13/403; B60T 13/38; B60T 13/385; B60T 2270/88; F16K 31/423
See application file for complete search history.

(56) References Cited

U.S. PATENT DOCUMENTS 5,069,472 A * 12/1991 Parr ....................... B62D 53/12
280/433
7,336,159 B2 * 2/2008 Fackrell .................. B60T 7/042
303/123
(Continued)

FOREIGN PATENT DOCUMENTS

DE 102008048207 A1 * 6/2010 ............ B60T 13/385
DE 102008063952 A1 * 6/2010 ............ B60T 13/263
(Continued)

*Primary Examiner* — Melody M Burch
(74) *Attorney, Agent, or Firm* — Leydig, Voit & Mayer, Ltd.

(57) ABSTRACT

An electropneumatic trailer supply module, for an electropneumatic parking brake system for a tractor vehicle/trailer combination, includes a supply connection configured to connect a compressed air supply, a trailer supply connection configured to deliver a supply pressure for a trailer vehicle, a pneumatically controlled main valve unit configured to provide the supply pressure to the trailer supply connection, and an electropneumatic pilot control unit configured to select at least a first control pressure at the pneumatically controlled main valve unit. When the first control pressure exceeds a predefined first threshold value of the pneumatically controlled main valve unit, the supply pressure provided to the trailer supply connection can be selected. When the first control pressure falls below the predefined first threshold value of the pneumatically controlled main valve unit, the trailer supply connection is configured to be vented.

24 Claims, 7 Drawing Sheets

(51) Int. Cl.
 B60T 13/38 (2006.01)
 F16K 31/42 (2006.01)
(52) U.S. Cl.
 CPC .......... B60T 13/683 (2013.01); F16K 31/423 (2013.01); *B60T 2270/413* (2013.01); *B60T 2270/88* (2013.01)

(56) References Cited

U.S. PATENT DOCUMENTS

| | | | | |
|---|---|---|---|---|
| 2001/0033105 | A1* | 10/2001 | Frank | B60T 8/3675 |
| | | | | 303/9.62 |
| 2010/0025141 | A1 | 2/2010 | Bensch | |
| 2011/0147141 | A1 | 6/2011 | Schnittger | |
| 2011/0168505 | A1* | 7/2011 | Hilberer | B60T 17/221 |
| | | | | 340/438 |
| 2018/0251112 | A1 | 9/2018 | Griesser et al. | |

FOREIGN PATENT DOCUMENTS

| | | | | |
|---|---|---|---|---|
| DE | 102011101438 | A1 | 11/2012 | |
| DE | 102011053707 | A1 | 3/2013 | |
| DE | 102012000435 | A1 * | 7/2013 | ............ B60T 13/662 |
| DE | 102014108681 | B3 | 4/2015 | |
| DE | 102014006013 | A1 | 10/2015 | |
| DE | 102015106150 | A1 | 10/2016 | |
| EP | 1968830 | B1 | 3/2010 | |
| EP | 2384943 | A2 | 11/2011 | |
| EP | 1785325 | B2 | 9/2012 | |
| EP | 3371017 | B1 | 10/2020 | |
| GB | 2472461 | A * | 2/2011 | ............ B60T 13/263 |
| WO | WO 2015154787 | A1 | 10/2015 | |
| WO | WO 2017055015 | A1 | 4/2017 | |

* cited by examiner

US 11,572,047 B2

ELECTROPNEUMATIC TRAILER SUPPLY MODULE FOR PROVIDING THE TRAILER SUPPLY PRESSURE

CROSS REFERENCE TO RELATED APPLICATIONS

This application is a U.S. National Phase Application under 35 U.S.C. § 371 of International Application No. PCT/EP2018/064069, filed on May 29, 2018, and claims benefit to German Patent Application No. DE 10 2017 007 781.9, filed on Aug. 16, 2017. The International Application was published in German on Feb. 21, 2019, as WO 2019/034296 under PCT Article 21(2).

FIELD

The invention relates to an electropneumatic trailer supply module for an electropneumatic parking brake system for commercial vehicles, in particular for tractor vehicle/trailer combinations, having a supply connection for connecting a compressed air supply and a trailer supply connection for transferring a supply pressure for the trailer vehicle.

BACKGROUND

Electropneumatic trailer supply modules for tractor vehicle/trailer combinations are used to provide a supply pressure for the trailer vehicle from a compressed air supply in the tractor vehicle. An electropneumatic trailer supply module of this kind may be integrated or provided alongside a so-called trailer control valve via which a control pressure is delivered to the trailer vehicle from the tractor vehicle. While the supply pressure provides a volume flow to actuate service brakes and/or spring-actuated brakes of a trailer vehicle, only a control pressure which represents a brake request signal is delivered via the trailer control valve.

Particularly in North America, corresponding connections to the tractor vehicle, in other words coupling heads, are not provided with a non-return valve which means that the coupling head is open for the supply pressure for the trailer vehicle and supply pressure should only be provided to the trailer vehicle from the tractor vehicle if there is a trailer vehicle attached.

In order to open the pneumatic connection between the tractor vehicle and the trailer vehicle via the coupling head and therefore provide the trailer vehicle with supply pressure, it is known in the art for a manually operated slide valve to be provided in the cab of the tractor vehicle, which slide valve is operated by the vehicle driver after the trailer vehicle has been coupled, in order to activate the provision of supply pressure to the trailer vehicle and thereby release the parking brake in the trailer.

However, as part of the ever-increasing automation and electrification of vehicles it is desirable for a manually operated valve of this kind to be replaced with electrical or electropneumatic components and, in particular, activated automatically or by a signal emitted by a switch in the driver's cab.

So-called parking brake modules are also known in the art which transfer a control pressure to the trailer control valve (TCV) so that the service brakes of the trailer vehicle are thereby applied in the parked state when spring-actuated brakes of the tractor vehicle are activated. A parking brake module of this kind is known from EP 1 968 830 B1, for example. The parking brake module disclosed there controls the pressure of the spring-actuated brakes of the tractor vehicle via a connection to the trailer control valve, so that the service brakes of the trailer vehicle are activated in conjunction with the spring-actuated brakes of the tractor vehicle.

A similar system is known from EP 2 384 943 A2, in which pressure is likewise delivered to the spring-actuated brakes. Further systems are also known from DE 10 2011 101 438 A1 and from DE 10 2015 106 150 A1.

SUMMARY

In an embodiment, the present invention provides an electropneumatic trailer supply module for an electropneumatic parking brake system for a tractor vehicle/trailer combination. The electropneumatic trailer supply module includes a supply connection configured to connect a compressed air supply, a trailer supply connection configured to deliver a supply pressure for a trailer vehicle, a pneumatically controlled main valve unit configured to provide the supply pressure to the trailer supply connection, and an electropneumatic pilot control unit configured to select at least a first control pressure at the pneumatically controlled main valve unit. When the first control pressure exceeds a predefined first threshold value of the pneumatically controlled main valve unit, the supply pressure provided to the trailer supply connection can be selected. When the first control pressure falls below the predefined first threshold value of the pneumatically controlled main valve unit, the trailer supply connection is configured to be vented.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
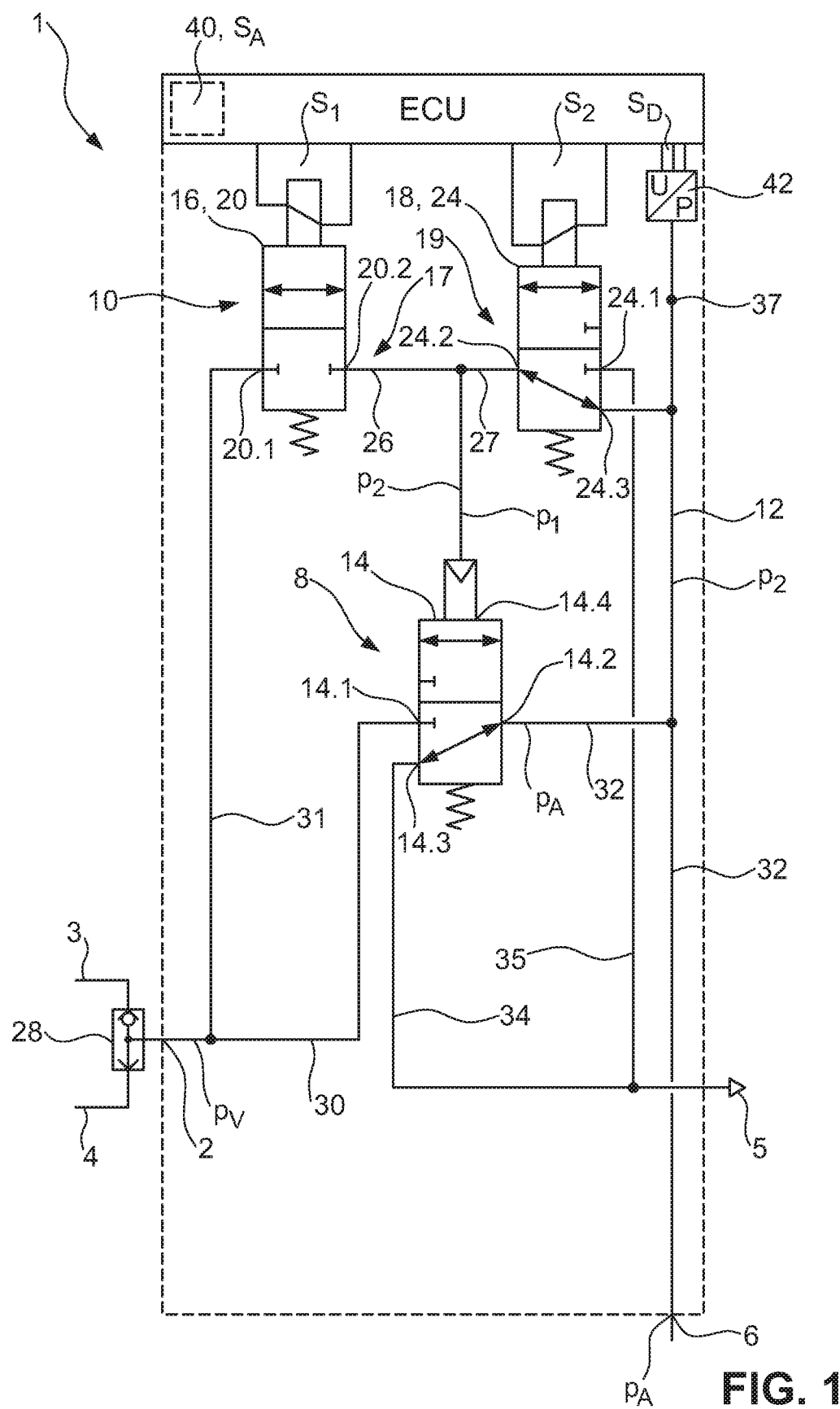
FIG. 1 shows a block diagram of an electropneumatic trailer supply module according to an embodiment.

The present disclosure provides electropneumatic trailer control modules for electropneumatic parking brake systems for commercial vehicles, in particular tractor vehicle/trailer combinations, having a supply connection for connecting a compressed air supply and a trailer supply connection for delivering a supply pressure for a trailer vehicle which allows the supply pressure for the trailer vehicle to be released and provided in a simple electronic manner and also, in the event that a pneumatic line from the tractor vehicle to the trailer supply connection should be severed, does not cause a complete venting of the corresponding compressed air supply, but switches off automatically.

According to a first aspect, the present disclosure provides electropneumatic trailer supply modules that include a pneumatically controlled main valve unit for providing supply pressure at the trailer supply connection and a pneumatic pilot control unit for selecting at least a first control pressure at the pneumatically controlled main valve unit, wherein when the first control pressure exceeds a predefined first threshold value of the pneumatically controlled main valve unit, the supply pressure at the trailer supply connection can be selected, and when the first control pressure falls short of the predefined first threshold value of the pneumatically controlled main valve unit the trailer supply connection can be vented.

In this way, by defining the first control pressure it is possible for the supply pressure to be provided at the trailer supply connection or for it to be vented. The electropneumatic pilot control unit is preferably switched based on the signals which represent the coupling of a trailer vehicle and/or are manually set by a vehicle driver. It can also be provided that a corresponding control pressure for switching the pneumatically controlled main valve unit is only provided when brakes, in particular service brakes, of the trailer vehicle actually have to be activated. In addition, it is conceivable for the starting of the engine of the tractor vehicle to be used as a starting point for a corresponding switch signal for the pilot control unit.

The pilot control unit in this case may be configured in such a manner that if the tractor vehicle is parked and the pilot control unit is switched to a currentless state, the control pressure drops and the trailer supply connection is vented. The converse scenario is also conceivable which is preferred if service brakes of the trailer vehicle are to be used as parking brakes and therefore have to be supplied with pressure when the tractor vehicle/trailer combination is in the switched off or parked state, in order to remain actuated.

Even though open coupling heads are normally used for the most part in North America for the trailer supply connection, it should be understood that embodiments described herein can have an application in other territories too, such as in Germany or Europe in particular. An electropneumatic trailer supply module of this kind is also preferred for coupling heads which are in addition fitted with a non-return valve, in order to prevent there being a leak via said non-return valve.

According to a first preferred embodiment, the supply pressure selected by the pneumatically controlled main valve unit is selectable as a second control pressure on the pneumatically controlled main valve unit, in order for the selected supply pressure pA to be maintained. It is preferably provided in this case that if the second control pressure exceeds a predefined second threshold value of the pneumatically controlled main valve unit the switching position is maintained, and if the second control pressure falls short of the predefined second threshold value of the pneumatically controlled main valve unit, the main valve unit switches and the trailer supply connection can be vented. This embodiment makes it possible, on the one hand, for the supply pressure to be automatically maintained as soon as it is selected, in that the supply pressure is fed back as the second control pressure in order to leave the main valve unit in the switching position in which the trailer supply connection is connected to the supply connection. In this switching position, supply pressure is provided from the supply connection to the trailer supply connection, which can then in turn be tapped off for the trailer vehicle at a corresponding coupling head. In the event that the supply pressure drops, for example because a connection between a coupling head and a corresponding pneumatic line has been broken and the supply pressure is no longer received from the trailer vehicle, but is conducted into the environment, the supply pressure falls below the second threshold value and the main valve unit switches, wherein the trailer supply connection is vented. In other words, in the switched position of the main valve unit, the trailer supply connection is then connected to a venting device, wherein the supply connection of the electropneumatic trailer supply module is preferably shut off at the same time. It is thereby achieved that when a pneumatic connection between the supply connection and the trailer vehicle is severed, the compressed air supply, which may be connected to the supply connection, is not vented into the environment but a shut-off takes place.

In order to achieve this, the electropneumatic trailer supply module preferably has a feedback line which is provided to select the supply pressure selected by the pneumatically controlled main valve unit as the second control pressure on the pneumatically controlled main valve unit. This feedback line may be conducted straight out of the main valve unit and provide the selected supply pressure to the pneumatic control input as feedback. The feedback line may, however, also branch from a portion close to the trailer supply connection or at any other point.

It may also be provided that the feedback line is provided internally in the main valve unit itself. In this case, the feedback line may run straight to the pneumatic control input of the main valve unit without a valve being inserted. A throttle is preferably provided in the feedback line in this case, in order to prevent accidental switching of the main valve unit due to slight pressure fluctuations and to facilitate the changeover of the switching position. An advantage in this case is that the electropneumatic pilot control unit may have a simpler design, for example it may only comprise two 2/2-way valves.

In a preferred embodiment, the feedback line is connected to the electropneumatic pilot control unit, wherein the electropneumatic pilot control unit allows the selection of the second control pressure on the pneumatically controlled main valve unit in a currentless switching position. On the other hand, when the electropneumatic pilot control unit is in an energized switching position, the second control pressure is preferably locked out.

When selecting the first and second control pressures on the main valve unit, in one variant it is preferred for the first and second control pressures to be assigned to a joint control area of the pneumatically controlled main valve unit. The first and second control pressures may, for example, be activated in a single control input of the main valve unit or via two separate control inputs in a control chamber which is delimited by a piston which has a control surface on which both the first and the second control pressures act in this case. The first threshold value corresponds to the second threshold value in this case. In order to implement two different threshold values for the first and second control pressure, it is necessary for two separate control surfaces to be used or, by means of different piston designs, for a different transmission ratio to be used for the first and second control pressures which are then supplied to the main valve unit via separate control inputs. It is also possible for a single control surface to be used for the two control pressures, wherein the first and second control pressures are provided in a differently throttled manner. In this way, different threshold values can also be achieved.

According to a further preferred embodiment, the pneumatically controlled main valve unit has a 3/2-way valve with a first main valve connection connected to the supply connection, a second main valve connection connected to the trailer supply connection, a third main valve connection connected to the venting device, and a first control connection connected to the pilot control unit on which the first control pressure can be selected. The main valve configured as a 3/2-way valve preferably has a first switching position in which the second main valve connection is connected to the third main valve connection and the trailer supply connection is thereby connected to the venting device and can be vented. In a second switching position of the main valve configured as a 3/2-way valve, the second main valve connection is preferably connected to the first main valve connection and the trailer supply connection is thereby connected to the supply connection. In this switching position, the supply pressure from the supply connection can be selected at the trailer supply connection at which the supply pressure is then provided. It is preferably provided that the main valve is in the first switching position when the first control pressure and/or the second control pressure fall(s) below the first or second threshold value.

It is preferably provided that the second control pressure can also be selected at the first control connection or the main valve has a second control connection at which the second control pressure can be selected. In this case, it is preferably provided that when the first and/or second control pressure is below the first or second threshold value, the main valve is in the first switching position and when the first and/or second control pressure is above the first or second threshold value, the main valve is in the second switching position. The main valve unit preferably comprises the main valve. In other words, there are preferably no other valves provided in the main valve unit apart from the main valve. This means that the electropneumatic trailer supply module has an even simpler design and fewer components can be used.

If the feedback line is directly returned, it is preferably directly connected to the first control connection or the second control connection, if such a second control connection exists. A valve, for example a valve of the electropneumatic pilot control unit, is not inserted between the feedback line and the first or second control connection in this case; instead, the second control pressure is selected at the first or second control connection as soon as the supply pressure is selected.

According to a further preferred embodiment, it is provided that the electropneumatic pilot control unit has an inlet valve and an outlet valve. The electropneumatic pilot control unit can preferably be connected to the supply connection via the inlet valve and the electropneumatic pilot control unit can preferably be connected to the venting device via the outlet valve.

The inlet valve is preferably assigned to an inlet circuit and the outlet valve to an outlet circuit, wherein the inlet circuit and the outlet circuit are pneumatically connected. In this case, it is sufficient for the main valve unit to have only one control connection—the first control connection—for both the first and second control pressures, since the inlet circuit and the outlet circuit are connected. Consequently, the inlet circuit can also be vented via the outlet circuit, or vice versa.

On one variant of this, it is provided that the inlet valve is assigned to an inlet circuit and the outlet valve is assigned to an outlet circuit, wherein the inlet circuit and the outlet circuit are separate. In this case, it is preferable for the main valve unit also to have the second control connection in addition to the first control connection, so that the inlet circuit and the outlet circuit are completely separable. In this way, a further independent control system can be achieved, even if the switching is slightly more complex.

According to a further preferred embodiment, the inlet valve is designed as a 2/2-way inlet valve. Particularly in the event that the inlet and outlet circuits are connected, the inlet circuit can be vented via the outlet circuit, which means that the inlet circuit does not require its own separate venting device. In the event that the inlet and outlet circuits are separate, the inlet circuit requires a separate venting device and the inlet valve is preferably configured as a 3/2-way inlet valve. If the inlet and outlet circuits are connected, this 3/2-way inlet valve can be replaced with a 2/2-way inlet valve, as a result of which switching is simplified overall.

The 2/2-way inlet valve preferably has a first 2/2-way inlet valve connection connected to the supply connection and a second 2/2-way inlet valve connection connected to the pneumatically controlled main valve unit. The second 2/2-way inlet valve connection is preferably connected to the first control connection of the main valve. The 2/2-way inlet valve has a first and a second switching position, wherein in the first switching position the first and second 2/2-way inlet valve connections are preferably separate and in the second switching position the first 2/2-way inlet valve connection is connected to the second 2/2-way inlet valve connection. The 2/2-way inlet valve can preferably be switched electropneumatically and is monostable manner in the first switching position.

In a variant which has already been briefly described above, the inlet valve is configured as a 3/2-way inlet valve. This is particularly preferred when the inlet circuit and the outlet circuit are pneumatically separate. In this case, the 3/2-way inlet valve preferably has a first 3/2-way inlet valve connection connected to the supply connection, a second 3/2-way inlet valve connection connected to the main valve unit, and a third 3/2-way inlet valve connection connected to a venting device. The second 3/2-way inlet valve connection is preferably connected to the first control connection. The first control pressure is therefore preferably selected via the second 3/2-way inlet valve connection and then provided at the main valve unit, in particular to the first control connection. The 3/2-way inlet valve preferably has a first and a second switching position, wherein in the first switching position of the 3/2-way inlet valve, the second 3/2-way inlet valve connection is connected to the third 3/2-way inlet valve connection and the second 3/2-way inlet valve connection is therefore vented in this position. The first control connection is therefore also vented, so that the main valve unit likewise switches in the venting position, insofar as the second control pressure is also below the second threshold value. In the second switching position of the 3/2-way inlet valve, the first 3/2-way inlet valve connection is preferably connected to the second 3/2-way inlet valve connection, so that the first control connection is vented and the first control pressure is selected at the first control connection. If this exceeds the first threshold value, the main valve unit switches to the second switching position, so that the supply pressure is selected at the trailer supply connection.

In a preferred development it is provided that the outlet valve is configured as a 2/2-way outlet valve. The 2/2-way outlet valve preferably has a first 2/2-way outlet valve connection connected to the main valve unit and a second 2/2-way outlet valve connection connected to a venting device. It is preferably provided that the 2/2-way outlet valve is currentless in a first closed switching position and energized in a second open switching position. The first 2/2-way outlet valve connection is preferably connected to the first or second control connection of the main valve unit. By switching the 2/2-way outlet valve, the first or second control connection of the main valve unit can therefore be vented. This variant is particularly preferable when the inlet valve is configured as a 3/2-way inlet valve or the inlet valve is configured as a 2/2-way inlet valve and the feedback line is directly connected to the first or second control connection, possibly using a throttle.

In a preferred development it is provided that the outlet valve is configured as a 3/2-way outlet valve. The 3/2-way outlet valve preferably has a first 3/2-way outlet valve connection connected to a venting device, a second 3/2-way outlet valve connection connected to a main valve unit, and a third 3/2-way outlet valve connection connected to the trailer supply connection. It is preferably provided that in a first switching position of the 3/2-way outlet valve the third 3/2-way outlet valve connection is connected to the second 3/2-way outlet valve connection and the supply pressure is consequently selected at the second 3/2-way outlet valve connection. This is then selected by the second 3/2-way outlet valve connection at the main valve unit, preferably as the second control pressure. To this end, the second 3/2-way outlet valve connection is preferably connected to the second control connection or, if a joint control connection is provided, to the first control connection of the main valve unit. In the second switching position of the 3/2-way outlet valve, the first 3/2-way outlet valve connection is preferably connected to the second 3/2-way outlet valve connection, so that the second 3/2-way outlet valve connection can be vented. In this case, a second control pressure is not selected either, but the second control connection is vented in the event that a second control connection is provided. Otherwise, the first control connection is vented if both the first and also the second control pressure are selected at the first control connection.

In a preferred development it is provided that the second 2/2-way inlet valve connection or the second 3/2-way inlet valve connection and the second 3/2-way outlet valve connection or the first 2/2-way outlet valve connection are connected to a joint control line which is in turn connected to the main valve unit so that both the first and the second control pressure can be selected at the main valve unit. It is conceivable for a select-high valve to be provided in order to avoid over-control, so that only the first or the second control pressure can be selected in each case at the control connection. In this case, a joint control surface is preferably also provided on an internal control piston of the main valve unit for both the first and also the second control pressure.

According to a further preferred embodiment, the electropneumatic trailer supply module has an electronic control unit with an electrical connection for receiving trailer coupling signals and/or for providing corresponding switch signals at least to the pilot control unit. The electrical connection for receiving trailer coupling signals may be connected to a vehicle bus (CAN-Bus), for example, for receiving an external trailer parking brake request or wired directly to a corresponding trailer parking brake switch in the vehicle driver's cab or outside the vehicle.

In addition, it is preferable for the electropneumatic trailer supply module to have a pressure sensor which is provided to detect the supply pressure and provide a corresponding pressure signal. The pressure sensor preferably supplies the pressure signal to the electronic control unit. The electronic control unit may deliver the pressure signal to a vehicle bus, or similar, or process it independently. It is possible to determine by means of the pressure sensor detected by the pressure sensor whether a supply pressure is selected or the trailer supply connection is non-pressurized.

The pressure signal is preferably provided for electropneumatic trailer identification and/or plausibility checking of a further trailer identification. In this case, the pressure signal may be received by the electronic control unit or a higher-level control unit and it is possible to determine based on the pressure signal received whether a trailer is attached. If no pressure is able to build up at the trailer supply connection or if the main valve unit does not switch to pneumatic maintenance, this is a sign that there is no trailer attached, but that the trailer supply connection is connected to the environment. The pressure signal can be used in the same way to run a plausibility check on a further trailer identification, for example an electronic identification. To this end, the pilot control unit and/or the main valve unit is/are preferably switched in such a manner that a pressure pulse is selected at the trailer supply connection. The pressure pulse is preferably selected only for a short, predefined period of time lasting a few seconds, so that when the trailer supply connection is connected to the environment, the supply need not necessarily be vented.

According to a second aspect, the present disclosure further provides electropneumatic parking brake modules with a parking brake unit, at least one spring accumulator connection for connecting at least one spring brake cylinder and an electropneumatic trailer supply module according to one of the preferred embodiments described above, wherein the parking brake unit receives supply pressure from the supply connection of the electropneumatic trailer supply module. In this way, an electropneumatic parking brake module and an electropneumatic trailer supply module are integrated. The two modules are preferably also housed in a joint housing.

It is furthermore preferable for the electropneumatic parking brake module according to the preceding aspect to have a trailer control unit with a trailer control connection for selecting a trailer control pressure which is provided to effect an actuation of service brakes of the trailer vehicle, wherein the trailer control unit receives supply pressure from the supply connection and receives the supply pressure as the third control pressure. It is preferably provided in this case that the trailer control unit only selects a trailer control pressure when the third control pressure exceeds a third threshold value. It is thereby guaranteed that the trailer control pressure is only selected when a supply pressure is also provided, in other words a trailer control pressure is only selected when service brakes of the trailer vehicle can actually be engaged.

For further preferred embodiments, full reference is made to the above description of the first aspect of the disclosure. It should be understood that the electropneumatic trailer supply module according to the first aspect of the disclosure and the electropneumatic parking brake module according to the second aspect of the disclosure can have the same and similar secondary aspects.

Embodiments of the invention are described below with the help of the drawings. This is not necessarily intended to illustrate the embodiments to scale but rather, where it is conducive to explanation, the drawings are configured in schematic and/or slightly distorted form. In relation to additions to the teaching that can be immediately recognized from the drawings, reference is made to the pertinent prior art. It should be taken into account in this case that various modifications and changes in relation to the shape and detail of an embodiment can be made without departing from the invention. For simplicity's sake, the same reference numbers are used below for identical or similar parts or parts with an identical or similar function.

An electropneumatic trailer supply module 1 according to an embodiment of the invention is used to provide a supply pressure for a trailer vehicle of a tractor vehicle/trailer combination starting from the tractor vehicle at a coupling head ("red coupling head"). The electropneumatic trailer supply module 1 may be used as a separate module or as part of a modular unit, such as, in particular, an electropneumatic parking brake unit (cf. FIG. 5-7), a combined axle modulator, a trailer control valve, or the like.

The electropneumatic trailer supply module 1 (FIG. 1) has a supply connection 2 to which a first compressed air supply 3 and a second compressed air supply 4 according to this exemplary embodiment are attached. The first and second compressed air supply 3, 4 are attached to the supply connection 2 by means of a select-high valve 28, so that the higher of the two pressures supplied by the first and second compressed air supplies 3, 4 is provided at the supply connection as the supply pressure pV.

A first supply pressure line 30 from which a second supply pressure line 31 branches runs from the supply connection 2. While the first supply pressure line 30 runs to a main valve unit 8 and supplies the main valve unit 8 with supply pressure pV, the second supply pressure line 31 runs to an electropneumatic pilot control unit 10 and supplies it with supply pressure pV.

The main valve unit 8 is pneumatically controlled and is used to provide a supply pressure pA at a trailer supply connection 6. A pneumatic line for the red coupling head can be attached to the trailer supply connection 6. The pilot control unit 10 provides a first control pressure p1 at the pneumatically controlled main valve unit 8, in order to switch the pneumatically controlled main valve unit 8. For this purpose, the pneumatically controlled main valve unit 8 has a first threshold value, wherein the pneumatically controlled main valve unit 8 is switched from a first switching position shown in FIG. 1 into a second switching position not shown in FIG. 1, when the first control pressure p1 exceeds the predefined first threshold value. By switching the pneumatically controlled main valve unit into the second switching position not shown in FIG. 1, the supply connection 2 is connected to the trailer supply connection via the main valve unit 8, so that the supply pressure pA is selected at the trailer supply connection 6. If the first control pressure falls short of the first threshold value, it is preferably provided that the main valve unit 8 is in the first switching position shown in FIG. 1 and the trailer supply connection 6 is connected to a venting device 5.

The main valve unit 8 according to this exemplary embodiment (FIG. 1) is specifically made up of a main valve 14 which is configured as a pneumatically controlled 3/2-way valve. The main valve 14 has a first main valve connection 14.1, a second main valve connection 14.2, and a third main valve connection 14.3. The first main valve connection 14.1 is connected to the first supply pressure line 30, and the second main valve connection 14.2 is connected to a supply pressure line 32. The third main valve connection 14.3 is in turn connected to a first venting line 34 which leads to the vent 5.\

According to this exemplary embodiment, the pilot control unit 10 has an inlet valve 16 and an outlet valve 18. The inlet valve 16 is connected to the supply connection 2 via the second supply pressure line 31, the outlet valve 18 is initially connected to the first venting line 34, and therefore to the venting device 5, via a second venting line 35. The first control pressure p1 can be selected via the inlet valve 16 in a first control line 26 which is connected to a first control connection 14.4 of the main valve unit 8, more precisely to the first control connection 14.4 of the main valve 14. The first control line 26 can be vented via the outlet valve 18 in this exemplary embodiment (FIG. 1).

The inlet valve 16 therefore defines an inlet circuit 17 and the outlet valve 18 defines an outlet circuit 19. Inlet and outlet circuits 17, 19 are connected in this exemplary embodiment, namely via the first control line 26 which is also referred to in this exemplary embodiment as a joint control line 26. Specifically, according to this exemplary embodiment (FIG. 1) the inlet valve 16 is designed as a 2/2-way inlet valve 20 and has a first 2/2-way inlet valve connection 20.1 and a second 2/2-way inlet valve connection 20.2. The first 2/2-way inlet valve connection 20.1 is connected to the second supply pressure line 31, and the second 2/2-way inlet valve connection 20.2 is connected to the first control line 26. The 2/2-way inlet valve 20 is configured as an electropneumatically switchable inlet valve and has a first switching position shown in FIG. 1 and a second switching position not shown in FIG. 1. While in the switching position shown in FIG. 1, the first 2/2-way inlet valve connection 20.1 and the second 2/2-way inlet valve connection 20.2 are separated, a connection is made between the first 2/2-way inlet valve connection 20.1 and the second 2/2-way inlet valve connection 20.2 in the second switching position not shown in FIG. 1. The 2/2-way inlet valve 20 is currentless in the first switching position shown in FIG. 1. In other words, no control pressure p1 is selected in a currentless state.

In this specific embodiment (FIG. 1), the outlet valve 18 is configured as a 3/2-way outlet valve 24. It has a first 3/2-way outlet valve connection 24.1, a second 3/2-way outlet valve connection 24.2, and a third 3/2-way outlet valve connection 24.3. In the first switching position shown in FIG. 1, the second 3/2-way outlet valve connection 24.2 is connected to the third 3/2-way outlet valve connection 24.3. By contrast, in a second switching position not shown in FIG. 1, the second 3/2-way outlet valve connection 24.2 is connected to the first 3/2-way outlet valve connection 24.1. The first 3/2-way outlet valve connection 24.1 is connected to the second venting line 35. The second 3/2-way outlet valve connection 24.2 is connected to a second control line 27 which, according to this exemplary embodiment (FIG. 1) opens into the first control line 26. For this purpose, a connection point 36 is provided between the first control line 26 and the second control line 27, as a result of which the inlet circuit 17 and the outlet circuit 19 are also pneumatically connected. The third 3/2-way outlet valve connection 24.3 is connected to a feedback line 12 which branches off from the supply pressure line 32. The feedback line 12 is configured as a control line and taps the supply pressure pA as the second control pressure p2.

Consequently, in the first switching position of the 3/2-way outlet valve 24 shown in FIG. 1, the supply pressure pA is selected as the second control pressure p2 in the second control line 27 and therefore also into the first control line 26 and finally at the first control connection 14.4 of the main valve 14. In the second switching position of the 3/2-way outlet valve 18 not shown in FIG. 1, however, the second control line 27 is connected to the venting device 5 and in this way vented, as a result of which the first control line 26 and the first control connection 14.4 are also vented. The inlet circuit 17 can therefore also be vented on account of the connection point 36 via the outlet valve 18.

In order to provide corresponding first and second switching signals S1, S2, the electropneumatic trailer supply module 1 according to this exemplary embodiment (FIG. 1) furthermore has an electronic control unit ECU. The electronic control unit ECU may be a separate control unit provided for the electropneumatic trailer supply module 1, but it may likewise be accommodated in a higher-level control unit, and the first and second switching signals S1, S2 are provided by direct wiring from a higher-level control unit. In this exemplary embodiment, the electronic control unit ECU has an electrical connection 40 via which trailer coupling signals SA, for example, can be provided from a trailer parking brake switch and/or possibly an external trailer parking brake request via a CAN bus. A trailer coupling signal SA indicates when a trailer is coupled to the tractor vehicle, particularly if a consumer is attached to the red coupling head, and consequently a supply pressure pA can, and is to, be provided. A trailer coupling signal SA of this kind may also be provided from a manually activated switch which is arranged in the driver's cab or other point on the tractor vehicle.

By energizing the 2/2-way inlet valve 20, it is moved from the first switching position shown in FIG. 1 into the second switching position not shown in FIG. 1. In a corresponding manner, by energizing the 3/2-way outlet valve 24, said valve is moved from the first switching position shown in FIG. 1 into the second switching position not shown in FIG. 1.

Finally, the electropneumatic trailer supply module 1 according to the first exemplary embodiment (FIG. 1) has a pressure sensor 42 which is connected to the feedback line 12 by means of a measuring line 37 and thereby detects the second control pressure p2 and therefore indirectly the supply pressure pA. The pressure sensor 42 provides a corresponding pressure signal SD to the electronic control unit ECU. In other embodiments, the pressure sensor 42 provides the pressure signal SD directly to a higher-level control unit such as a central module or the like. It is possible to detect by means of the pressure sensor 42 whether a supply pressure pA is selected or not.

The mode of operation of the electropneumatic trailer supply module 1 according to the first exemplary embodiment (FIG. 1) is as follows. If a trailer coupling signal SA is received or if the supply pressure pA is to be provided in some other way, the first switching signal S1 is provided by the electronic control unit ECU and the 2/2-way inlet valve 20 is moved from the first switching position shown in FIG. 1 into the second switching position not shown in FIG. 1. As a result, the first control pressure p1 is selected at the first control connection 14.4. As soon as the first control pressure p1 exceeds the first predefined threshold value of the main valve 14, the main valve 14 switches from the first switching position shown in FIG. 1 into the second switching position not shown in FIG. 1. The first control pressure p1 is volume-boosted and the trailer supply connection 6 is connected to the supply connection 2 via the main valve 14. The supply pressure pA is provided. The outlet valve 18 is in the first switching position, to be more precise the 3/2-way outlet valve 24 is in the first switching position shown in FIG. 1. In this switching position, the feedback line 12 is connected to the second control line 27 so that the second control pressure p2 is also provided at the first control connection 14.4 via the 3/2-way outlet valve 24. The second control pressure p2 is usually approximately the same as the first control pressure p1, so that there is no override. If necessary, it may also be provided that a select-high valve is used at the connection point 36 in order to avoid overriding. The second control pressure p2 therefore maintains the switched state of the main valve 14. The 2/2-way inlet valve 20 can be switched to a currentless state again and revert to the first currentless switching state (shown in FIG. 1). Via the 3/2-way outlet valve 24 which is likewise switched into a currentless state, the second control pressure p2 remains selected at the first control connection 14.4 and the main valve 14 remains in the second switching position not shown in FIG. 1. In this switching position, the supply pressure pA remains permanently selected.

If, in the event that a line is removed from the red coupling head, the trailer supply connection 6 is directly connected to the environment. The pressure in the supply pressure line 32 drops and as a result the second control pressure p2 also drops. This falling second control pressure p2 is provided at the first control connection 14.4 via the 3/2-way outlet valve 24 switched in a currentless manner. As soon as the second control pressure p2 then falls short of the first or second predefined threshold value of the main valve 14, the main valve 14 switches into the first switching position shown in FIG. 1 and connects the trailer supply connection 6 to the venting device 5. At the same time, the main valve 14 blocks the first main valve connection 14.1 so that the supply connection 2 is shut off and is no longer connected to the environment. This prevents supply pressure pV from escaping from the first and second compressed air supplies 3, 4 in the event of a severing at the red coupling head.

Figure 2:
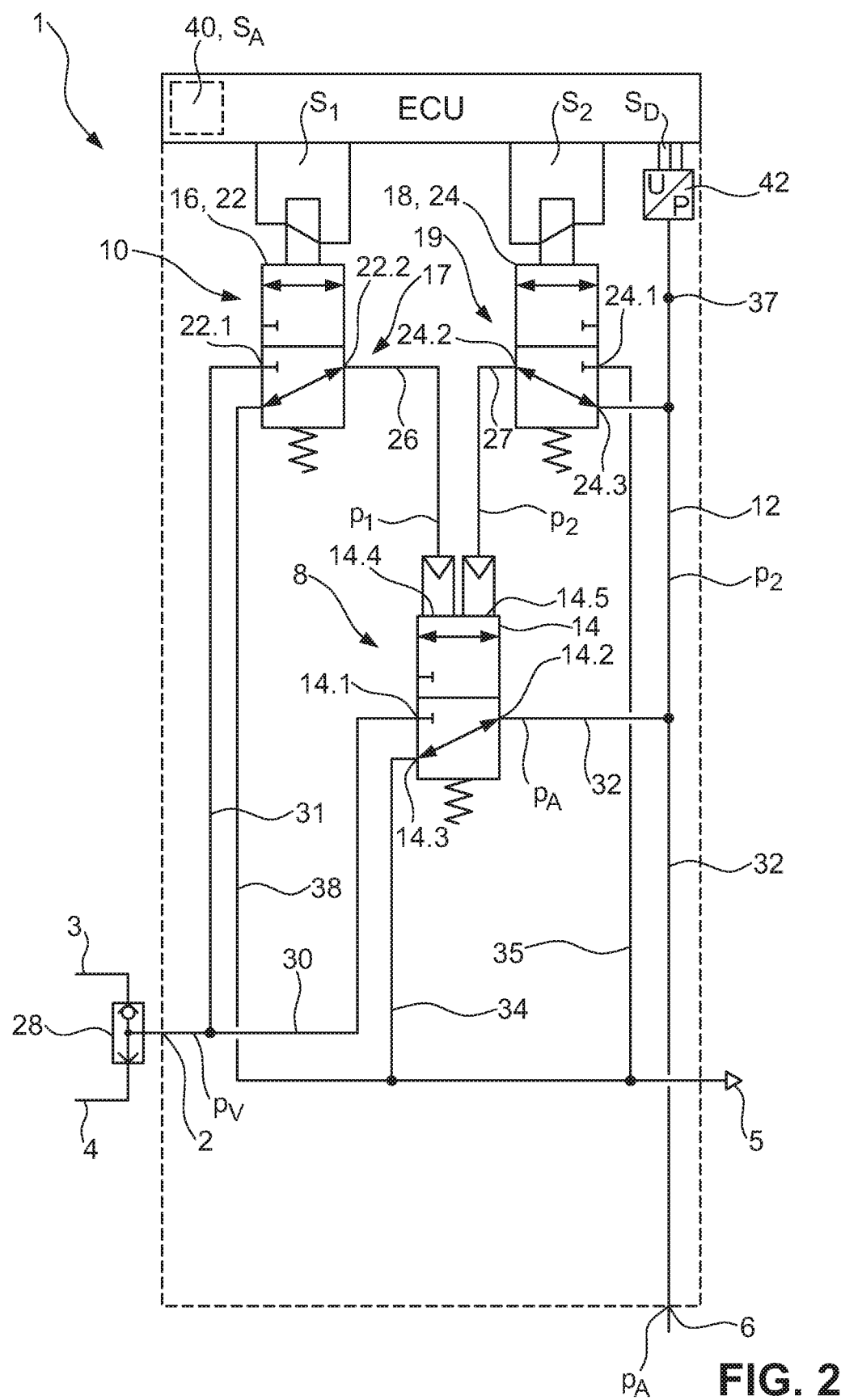
FIG. 2 shows a block diagram of an electropneumatic trailer supply module according to an embodiment.

FIG. 2 shows a second exemplary embodiment of the electropneumatic trailer supply module 1. The same and similar elements are provided with the same reference numbers and to this extent they refer in full to the above description of the first exemplary embodiment (FIG. 1). Differences as compared with the first exemplary embodiment (FIG. 1) are, in particular, highlighted below.

An essential difference in the second exemplary embodiment (FIG. 2) lies in the fact that the inlet circuit 17 and the outlet circuit 19 are pneumatically separated, or may be pneumatically separated.

In order to achieve this, the inlet valve 16 is configured as a 3/2-way inlet valve 22 and has a first 3/2-way inlet valve connection 22.1, a second 3/2-way inlet valve connection 22.2 and a third 3/2-way inlet valve connection 22.3. The first 3/2-way inlet valve connection 22.1 is connected in a manner known in the art to the second supply pressure line 31. The second 3/2-way inlet valve connection is likewise connected to the first control line 26 in a manner known in the art. The third 3/2-way inlet valve connection 22.3 is used for venting the inlet circuit 17 and is therefore connected to a third venting line 38 which leads to the venting device 5. In the currentless first switching position (shown in FIG. 2) the second 3/2-way inlet valve connection 22.2 is therefore connected to the third 3/2-way inlet valve connection 22.3 and thereby connects the first control line 26 to the venting device 5 in order to vent the inlet circuit 17.

A further difference is that in order to separate the inlet circuit 17 from the outlet circuit 19, the main valve unit 8 has a second control connection 14.5. More specifically, the main valve 14 has the second control connection 14.5. The second control connection 14.5 is connected to the second control line 27 which leads in a manner known in the art to the second 3/2-way outlet valve connection 24.2 of the 3/2-way outlet valve 24. As in the first exemplary embodiment (FIG. 1), the outlet valve 18 is also configured as a 3/2-way outlet valve 24 in the second exemplary embodiment (FIG. 2).

Finally, a complete separation of the inlet circuit 17 from the outlet circuit 19 requires the first control connection 14.4 and the second control connection 14.5 to open into two separate control chambers and, in particular, to act on two separate control surfaces. This also makes it possible for a second threshold value to be provided for the second control pressure p2. In this way, an improved circuit can be achieved, since the two control pressures p1 and p2 are independent of one another. As soon as either the first control pressure p1 exceeds the first threshold value or the second control pressure p2 exceeds the second threshold value, the main valve 14 switches into the second switching position which is not shown in FIG. 2 and connects the supply connection 2 to the trailer supply connection 6, in order to select the supply pressure pA.

The remaining elements in the second exemplary embodiment (FIG. 2) are identical to the first exemplary embodiment (FIG. 1).

Figure 3:
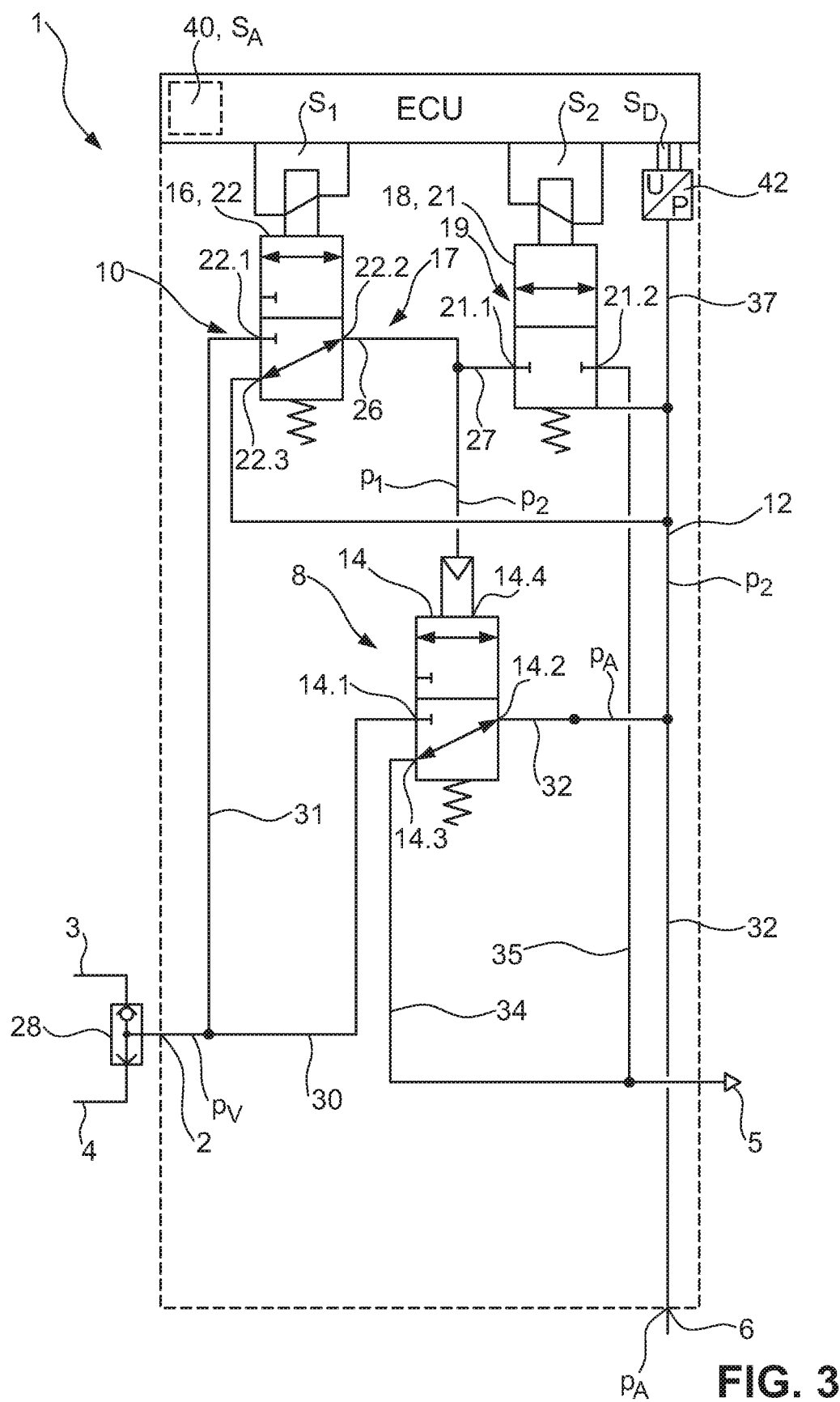
FIG. 3 shows a block diagram of an electropneumatic trailer supply module according to an embodiment.

A third exemplary embodiment of the electropneumatic trailer supply module 1 is shown in FIG. 3. The same and similar elements are provided with the same reference numbers and reference is made to this extent to the above description of the first exemplary embodiment (FIG. 1) and to the second exemplary embodiment (FIG. 2). Differences as compared with the first and second exemplary embodiments (FIGS. 1 and 2) are particularly emphasized below.

In principle, the circuit layout in the third exemplary embodiment (FIG. 3) is comparable with the first exemplary embodiment (FIG. 1) since the main valve 14 is only fitted with a first control connection 14.4 and to this extent both the first and the second control pressure p1, p2 are selected at this first control connection 14.4.

Unlike in the case of the first exemplary embodiment, however, the inlet valve 16 is configured as a 3/2-way inlet valve 22, as is already known from the second exemplary embodiment (FIG. 2), and the outlet valve 18 is configured as a 2/2-way outlet valve 21. To this extent, the circuit has a reverse configuration in the electropneumatic pilot control unit 10. The feedback line 12 does not run to the outlet valve 18, as in the first exemplary embodiment, but to the inlet valve 16. More specifically, the feedback line 12 is connected to the third 3/2-way inlet valve connection 22.3 in such a manner that in the currentless first switching position of the 3/2-way inlet valve 22, the feedback line 12 is connected to the first control line 26 and the second control pressure p2 can be selected at the first control connection 14.4. The final venting of the first control connection 14.4 is then facilitated via the outlet valve 18 which is configured as a 2/2-way outlet valve 21. The 2/2-way outlet valve 21 has a first 2/2-way outlet valve connection 21.1 and a second 2/2-way outlet valve connection 21.2. The first 2/2-way outlet valve connection 21.1 is connected to the second control line 27 and therefore to the first control connection 14.4. The second 2/2-way outlet valve connection 21.2 is connected to the second venting line 35 which is in turn connected to the venting device 5. The 2/2-way outlet valve 21 has a first currentless switching position in which it is closed (see FIG. 3) and a second switching position not shown in FIG. 3 in which it can be moved by the second signal S2 and in which the first 2/2-way outlet valve connection 21.1 is connected to the second 2/2-way outlet valve connection 21.2.

Figure 4:
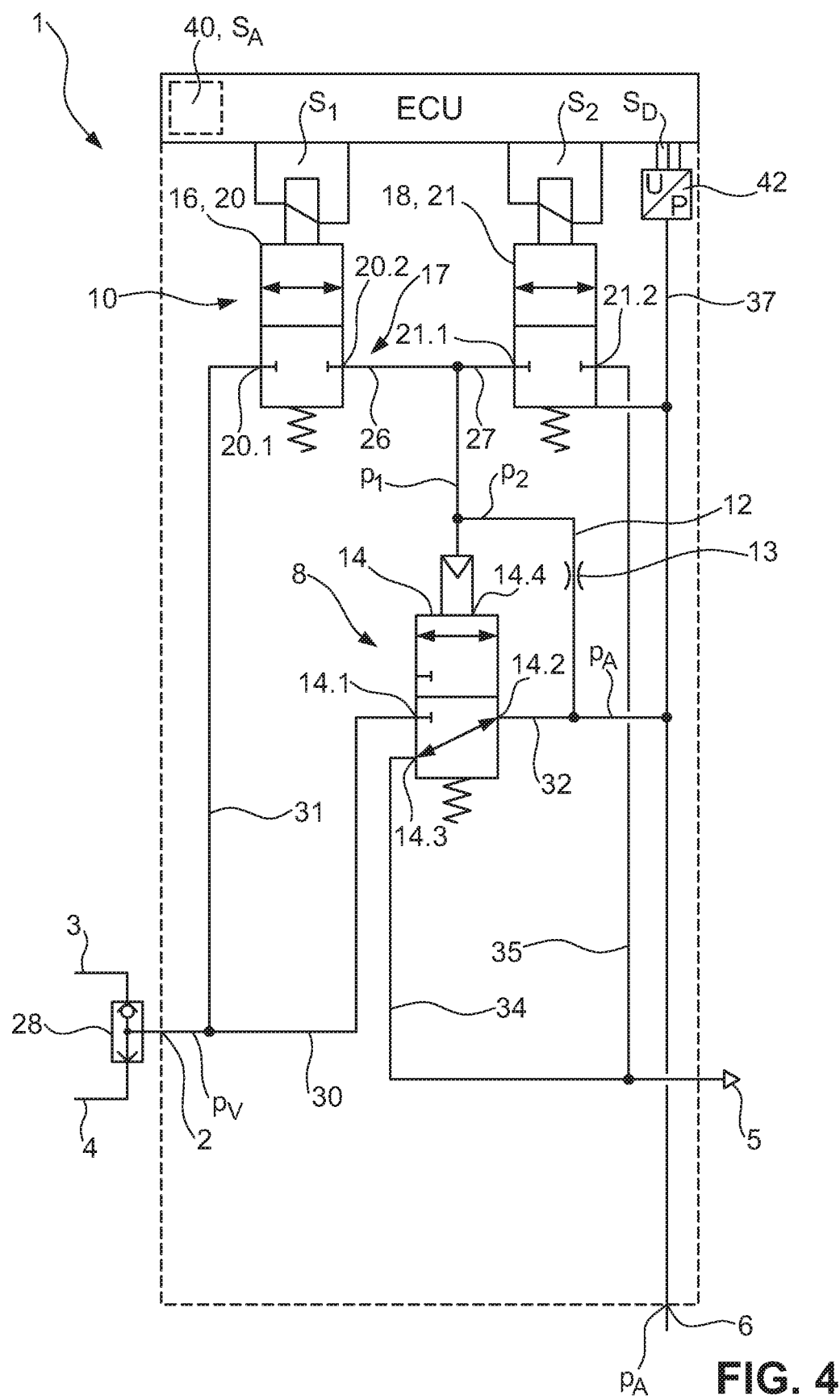
FIG. 4 shows a block diagram of an electropneumatic trailer supply module according to an embodiment.

FIG. 4 shows a further variant of the electropneumatic trailer supply module 1. This fourth variant is based on the first and third exemplary embodiments (FIGS. 1 and 3), since a main valve 14 with only a first control connection 14.4 is in turn provided.

The same and similar elements are in turn provided with the same reference numbers and, to this extent, reference is made to the above description of the first three exemplary embodiments (FIGS. 1, 2 and 3). Differences from the first and third exemplary embodiment (FIGS. 1 and 3) are particularly emphasized in the following.

The most important difference in this fourth exemplary embodiment (FIG. 4) is that the feedback line 12 is conducted straight to the first control connection 14.4 without previously running to the electropneumatic pilot control unit 10. While the switching of at least one valve was necessary in each case in the first three exemplary embodiments (FIGS. 1 to 3) in order to select the second control pressure p2 at the first control connection 14.4, this takes place automatically in the fourth exemplary embodiment (FIG. 4), as soon as the supply pressure pA is selected. For this purpose, the feedback line 12 branches in a known manner from the supply pressure line 32 and runs directly without the insertion of a valve to the first control connection 14.4.

Another special feature is that a throttle 13 is arranged in the feedback line 12 which is used to throttle the pressure which is fed back, so that the slight pressure fluctuation does not lead to a direct switchover of the main valve unit 12 and a changeover of the switching position is enabled. It should be understood that the throttle 13 can also be provided in the feedback lines 12 of the first three exemplary embodiments (FIGS. 1, 2 and 3).

As a result of the direct return of the feedback line 12, the pilot control unit 10 can be more simply configured. In this exemplary embodiment (FIG. 4) the pilot control unit 10 therefore has the 2/2-way inlet valve 20 as an inlet valve 16 and the 2/2-way outlet valve 21 as an outlet valve 18, as has already been the case in the third exemplary embodiment (FIG. 3). In relation to the switching of the inlet and outlet valves 16, 18, reference is therefore made to the first exemplary embodiment (FIG. 1) for the inlet valve 16 and to the third exemplary embodiment (FIG. 3) for the outlet valve 18.

Figure 5:
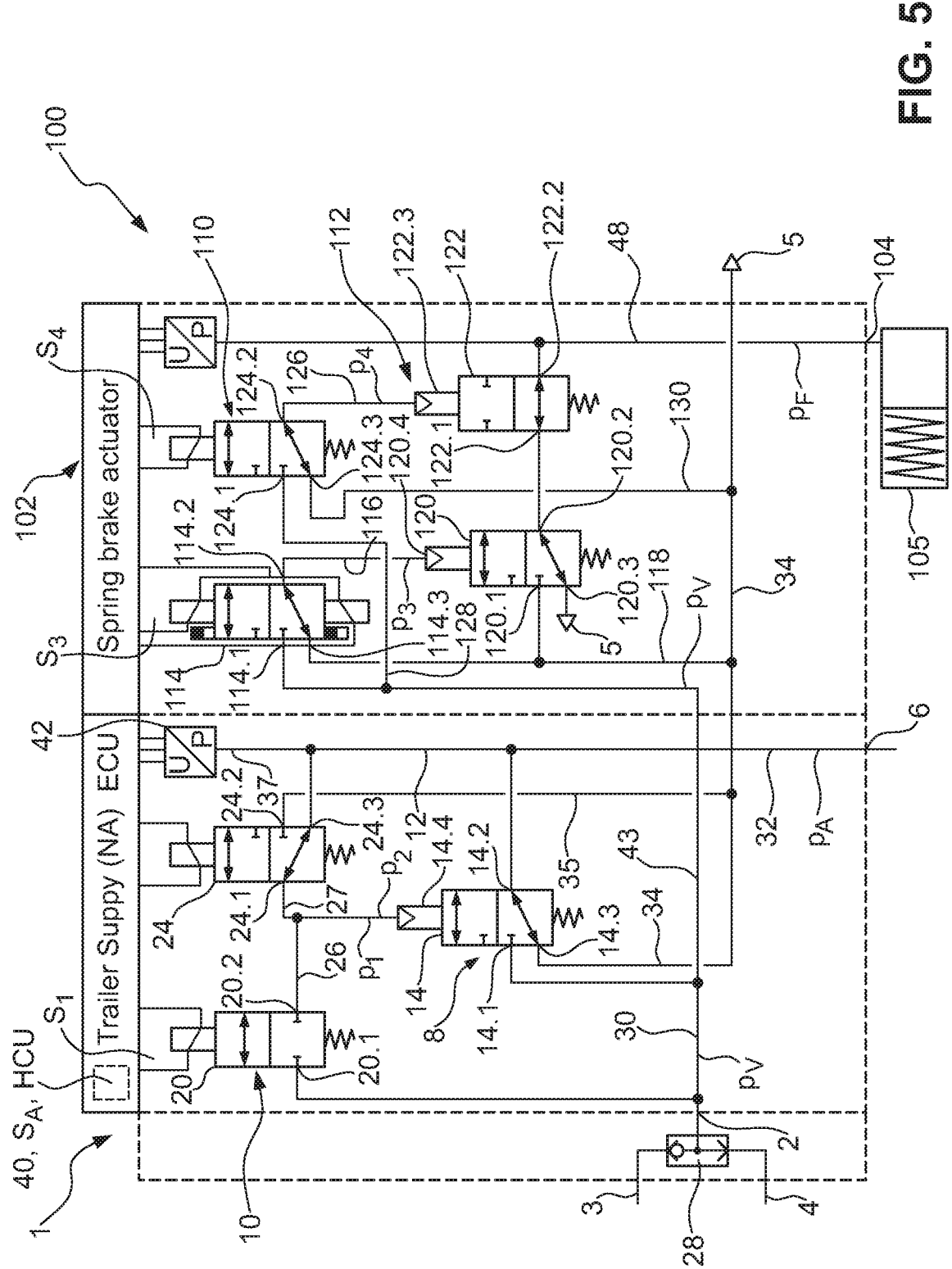
FIG. 5 shows a block diagram of an electropneumatic parking brake module according to an embodiment.
Figure 6:
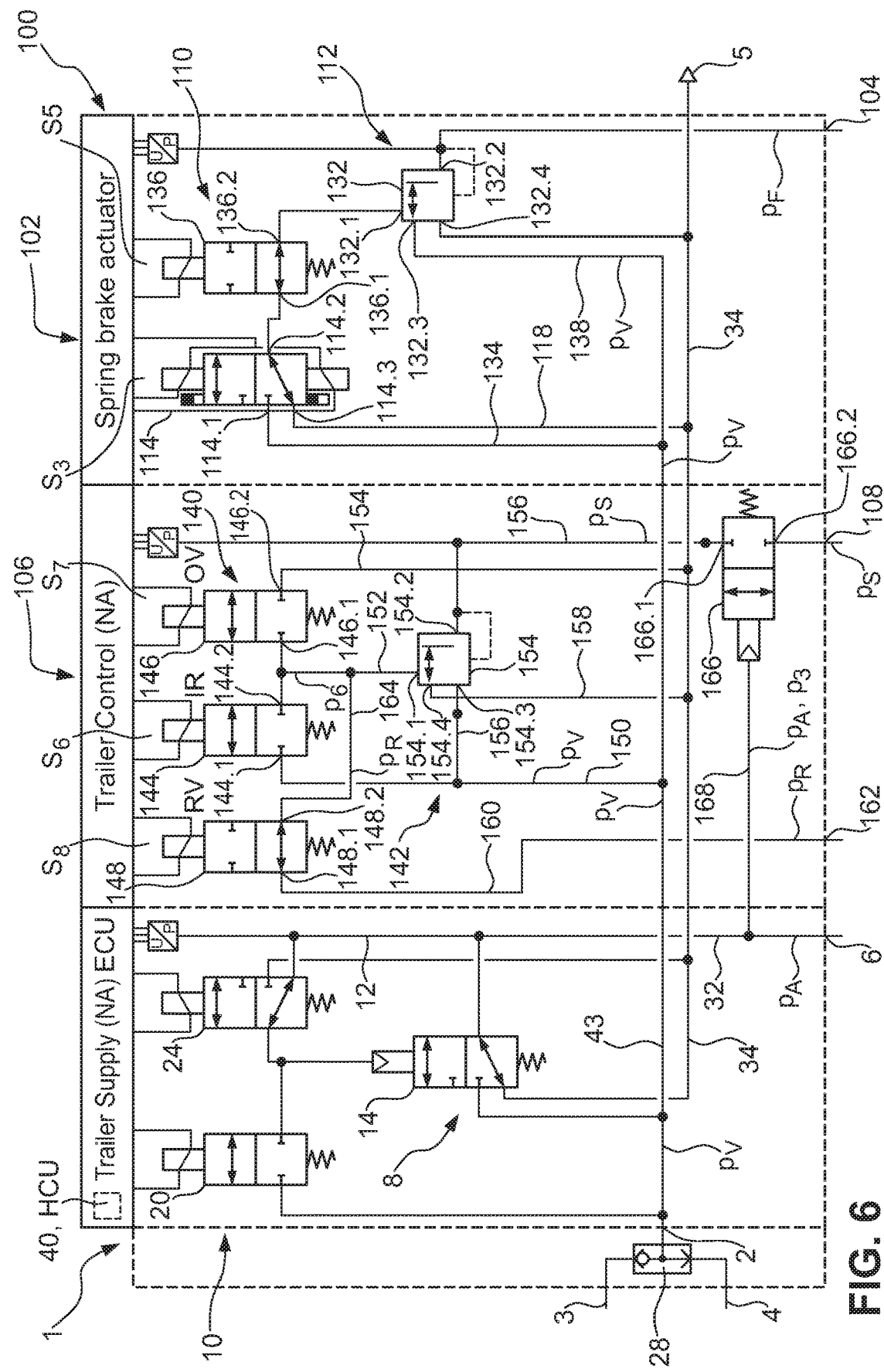
FIG. 6 shows a block diagram of an electropneumatic parking brake module according to an embodiment.
Figure 7:
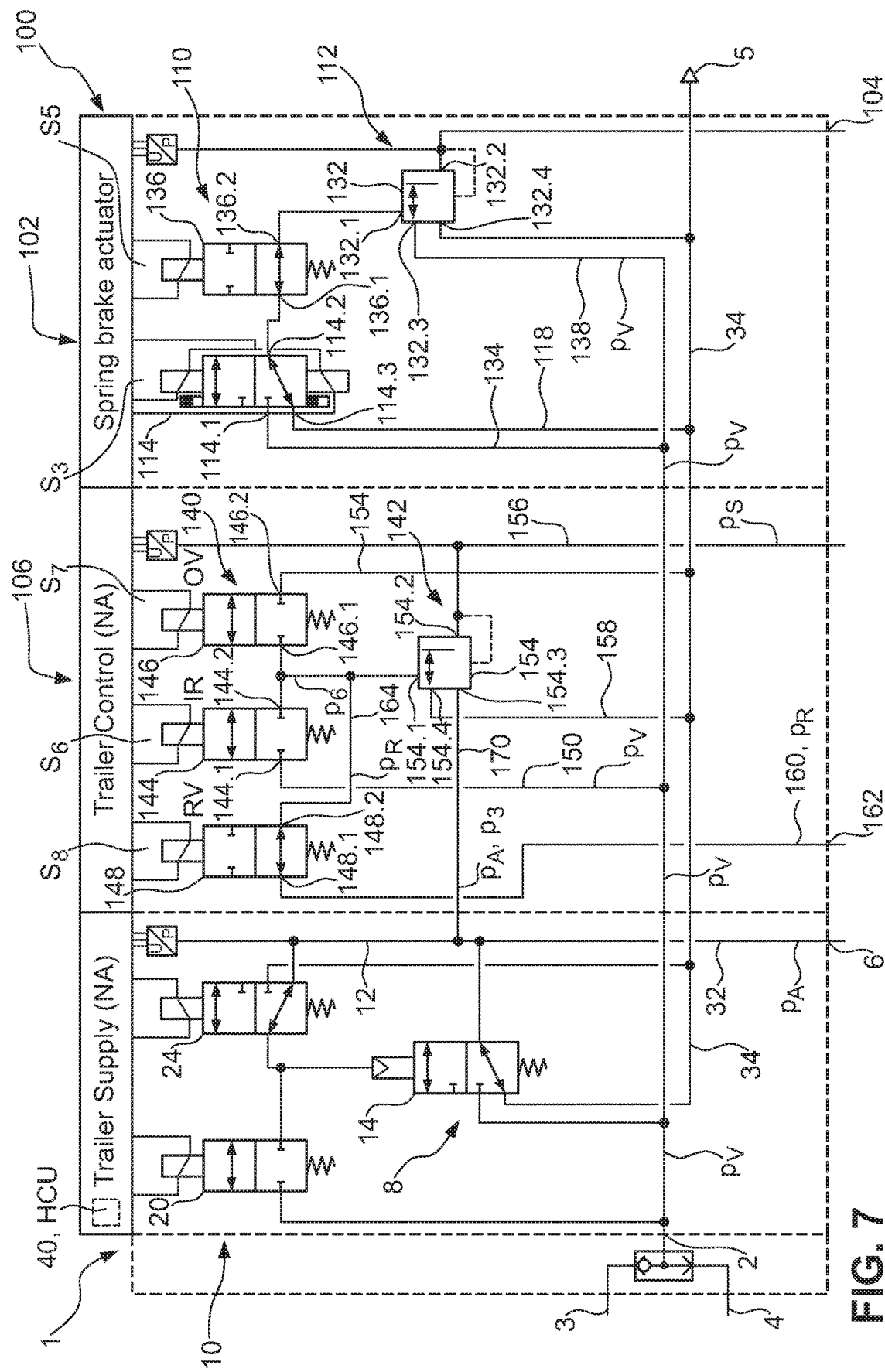
FIG. 7 shows a block diagram of an electropneumatic parking brake module according to an embodiment.

FIGS. 5 to 7 show three different exemplary embodiments of electropneumatic parking brake modules 100 in which the electropneumatic trailer supply module 1 can be used in accordance with the present invention. While FIG. 5 shows an example of a basic design of an electropneumatic parking brake module 100, FIGS. 6 and 7 each show electropneumatic parking brake modules 100 which have, in addition, a trailer control unit 106 to deliver a control pressure to a trailer vehicle, in particular to select a control pressure at the so-called "yellow coupling head" or, depending on the country, also the "blue coupling head".

In relation to FIG. 5, the first exemplary embodiment of the electropneumatic parking brake module 100 is initially described.

The electropneumatic parking brake module 100 according to the first exemplary embodiment (FIG. 5) has a parking brake unit 102 and an electropneumatic trailer supply module 1 according to the first exemplary (FIG. 1) described above. It should be understood that an electropneumatic trailer supply module 1 according to the second exemplary embodiment (FIG. 2), the third exemplary embodiment (FIG. 3), or the fourth exemplary embodiment (FIG. 4) can likewise be provided; in this way, no further changes result. For example, the electropneumatic parking brake module 100 according to the first exemplary embodiment (FIG. 5) is for this reason described only with the electropneumatic trailer supply module 1 according to the first exemplary embodiment (FIG. 1).

In addition to these two units, the electropneumatic parking brake module 100 has a spring accumulator connection 104 to which a spring brake cylinder 105 can be attached. Spring brake cylinders 105 are customarily provided in the tractor vehicle, particularly at the rear axle of the tractor vehicle, in order to brake the tractor vehicle when said tractor vehicle, or also the tractor vehicle/trailer combination, is in the parked state. Spring brake cylinders 105 are known in the art and act inversely, in other words they are open in the aerated state and applied in the vented state. For this purpose, a spring is provided in the inside which applies the spring brake cylinder 105 in the vented state.

Spring brake cylinders 105 are therefore used as parking brakes, so-called electropneumatic handbrakes, and also as supplementary or auxiliary brakes in special driving situations.

Overall, the electropneumatic parking brake module 100 has a single supply connection 2 which is provided on the electropneumatic trailer supply module 1. A third supply pressure line 43 branches off from the first supply pressure line 30 and runs to the parking brake unit 102 in order to supply the parking brake unit 102 with supply pressure pV. The parking brake unit 102 therefore receives supply pressure pV from the supply connection 2.

The parking brake unit 102 according to this first exemplary embodiment (FIG. 5) has a special feature, since it does not have a relay valve which is usually provided in so-called parking brake units or other parking brake modules (see also FIGS. 6 and 7).

According to this exemplary embodiment (FIG. 5), the parking brake unit 102 has a parking brake pilot control unit 110 and a parking brake inlet/outlet unit 112. The parking brake inlet/outlet unit 112 is pneumatically controlled based on a fourth and fifth control pressure p4, p5 which is provided by the parking brake pilot unit 110.

As a result of this, the supply pressure pV can be directly controlled and directly selected as the spring brake pressure pF at the spring accumulator connection 104.

The parking brake pilot control unit 110 has a bistable control valve 114 with a first bistable valve connection 114.1, a second bistable valve connection 114.2, and a third bistable valve connection 114.3. The first bistable valve connection 114.1 is connected to the third supply pressure line 43. The second bistable valve connection 114.2 is connected to a third control line 116, and the third bistable valve connection 114.3 is connected to a fourth venting line 118. The fourth venting line 118 opens into the first venting line 34 and finally to the venting device 5. Through corresponding switching of the bistable control valve 114, a fourth control pressure p4 can therefore be selected at the second bistable valve connection 114.2 which is provided via the third control line 116 at the parking brake inlet/outlet unit 112. More specifically, the fourth control pressure p4 is selected at a parking brake inlet valve 120. The parking brake inlet valve 120 is configured as a pneumatically controlled 3/2-way valve and has a first parking brake inlet valve connection 120.1, a second parking brake inlet valve connection 120.2, and a third parking brake inlet valve connection 120.3. In addition, it has a third control connection 120.4 at which the fourth control pressure p4 can be selected via the third control line 116. When the fourth control pressure p4 falls short of a fourth threshold value, the parking brake inlet valve 120 is in the first switching position shown in FIG. 5, in which the second parking brake inlet valve connection 120.2 is connected to the third parking brake inlet valve connection 120.3, which is in turn connected to a venting device 5. If the fourth control pressure p4 exceeds the fourth threshold value, the parking brake inlet valve 120 switches into the second switching position not shown in FIG. 5 and connects the first parking brake inlet valve connection 120.1 to the second parking brake inlet valve connection 120.2, so that the supply pressure pV is selected at said second parking brake inlet valve connection 120.1.

The second parking brake inlet valve connection 120.2 is connected to a parking brake shut-off valve 122. The parking brake shut-off valve 122 is configured as a pneumatically switched 2/2-way valve and has a first parking brake shut-off valve connection 122.1 and a second parking brake shut-off valve connection 122.2. Finally, the parking brake shut-off valve 122 has a fourth control connection 122.3, at which the fifth control pressure p5 can be selected. When the fifth control pressure p5 falls short of a fifth threshold value, the parking brake shut-off valve 122 is in the first switching position shown in FIG. 5 and connects the first parking brake shut-off valve connection 122.1 to the second parking brake shut-off valve connection 122.2. If, however, the fifth control pressure p5 exceeds the fifth threshold value of the parking brake shut-off valve 122, said parking brake shut-off valve 122 switches into the second switching position which is not shown in FIG. 5, wherein the first and second parking brake shut-off valve connections 122.1, 122.2 are separated. In the open state, the parking brake shut-off valve 122 allows the pressure selected by the parking brake inlet valve to be controlled and present at the second parking brake shut-off valve connection 122.2 which is in turn connected to a parking brake pressure line 48. The spring brake pressure pF is selected in the parking brake pressure line 48.

The fifth control pressure p5 is selected by a 3/2-way control valve 124. The 3/2-way control valve 124 has a first control valve connection 124.1, a second control valve connection 124.2 and a third control valve connection 124.3. The second control valve connection 124.2 is connected to a fourth control line 126 in which the fifth control pressure p5 is selected. Furthermore, the first control valve connection 124.1 is connected to the fourth supply pressure line 43 via a fifth supply pressure line 128 in order to select the fifth control pressure p5. The third control valve connection 124.3 is in turn connected to a fifth venting line 130, which in turn opens into the first venting line 34.

The method of operation of the parking brake 102 according to this exemplary embodiment (FIG. 5) is as follows: A third switching signal S3 for the bistable control valve 114 is provided by the electronic control unit 40. The bistable control valve 114 is then moved to the second stable switching state (not shown in FIG. 5), as a result of which the fourth control pressure p4 is selected. As soon as the fourth control pressure p4 exceeds the fourth threshold value, the parking brake inlet valve 120 switches and the supply pressure pV is controlled and provided at the spring accumulator connection 104 as the spring brake pressure pF. In this state, the parking brake shut-off valve 122 is open and the 3/2-way control valve 124 is currentless. The bistable control valve 114 is also currentless but stable in its second switching position, particularly on account of a magnet which holds the valve armature. The spring brake pressure pF remains selected and the spring brake cylinder 105 is aerated and therefore opened. In order to vent the spring brake cylinder 105, the bistable control valve 114 must be switched again, so that the fourth control pressure p4 is vented and the parking brake inlet valve 120 switches into the first switching position shown in FIG. 5. The spring accumulator connection 104 is vented and the spring brake cylinders 105 applied.

The 3/2-way control valve 124 and the parking brake shut-off valve 122 are used in particular for the pulsed aeration and venting of the spring accumulator connection 104 when the parking brake cylinders 105 are intended to be used for auxiliary braking or supplementary braking. For this purpose, it is then not necessary for the bistable control valve 114 to be switched back and forth but instead it is sufficient for corresponding fourth switching signals S4 to be selected at the 3/2-way control valve 124 so that the parking brake shut-off valve 122 is pulsed.

The second exemplary embodiment of the electropneumatic parking brake module 100 (FIG. 6) differs from the first exemplary embodiment of the electropneumatic parking brake module (FIG. 5) particularly in that the parking brake unit 102 only has a single parking brake relay valve 132 in the parking brake inlet/outlet unit 112, rather than the parking brake inlet valve 120 and the parking brake shut-off valve 122. A further difference lies in the fact that a trailer control unit 106 is provided which has a trailer control connection 108 for selecting a trailer control pressure pS which is provided to bring about actuation of operating brakes of the trailer vehicle. The trailer control pressure pS is preferably provided at the so-called yellow coupling head.

The parking brake unit 102 according to this second exemplary embodiment (FIG. 6) of the electropneumatic parking brake module 100 is described to begin with. The parking brake pilot control unit 110 in turn has a bistable control valve 114 which is connected by its first bistable valve connection 114.1 to a sixth supply pressure line 134 which branches off from the third supply pressure line 43. In this way, the supply pressure pV is again provided for the parking brake unit 102 by the supply connection 2 of the electropneumatic trailer supply module 1. The third bistable valve connection 114.3 is in turn connected to the first venting line 34, and therefore to the venting device 5, via the fourth venting line. At the second bistable valve connection 114.2, a sixth control pressure p6 is selected which is initially provided at a 2/2-way control valve 136 which controls said pressure in a currentless manner. The 2/2-way control valve 136 has a first 2/2-way control valve connection and a second 2/2-way control valve connection. By means of a fifth switching signal S5 which is provided by the electronic control unit ECU, the 2/2-way control valve 136 can be moved from the first open switching position shown in FIG. 6 into a second closed switching position not shown in FIG. 6. In the same way as the 3/2-way control valve, the 2/2-way control valve 136 is likewise essentially used for the pulsed aeration and venting, or the staggered aeration and venting, of the spring accumulator connection 104.

The 2/2-way control valve 136 selects a sixth control pressure p6 which is provided at a parking brake relay valve control connection 132.1 of the relay valve 132. The parking brake relay valve 132 furthermore includes a parking brake relay valve working connection 132.2, a parking brake relay valve supply connection 132.3, and a parking brake relay valve venting connection 132.4. The spring accumulator pressure pF which corresponds to a volume-boosted sixth control pressure p6 is selected at the parking brake relay valve working connection 132.2. By means of the parking brake relay valve supply connection 132.3, the parking brake relay valve 132 is connected via a seventh supply pressure line 138 to the third supply pressure line 43, so that the supply pressure pV is selected at the parking brake relay valve supply connection 132.3. The parking brake relay valve 132 is connected to the first venting line 34, and therefore to the venting device 5, via the parking brake relay valve venting connection 132.4. This design of a parking brake unit 102 is generally known in the art.

According to this exemplary embodiment (FIG. 6) a trailer control unit 106 is arranged between the electropneumatic trailer supply module 1 and the parking brake unit 102. The trailer control unit 106 is used to select a trailer control pressure pS which generally represents the service brake pressure for the trailer vehicle. For this purpose, the trailer control unit 106 has a trailer pilot control unit 140 and a trailer inlet/outlet unit 142. The trailer pilot unit 140 has a trailer inlet valve 144, a trailer outlet valve 146, and a trailer redundancy valve 148. All three valves 144, 146, 148 are configured as electropneumatically switched 2/2-way valves. The trailer inlet valve 144 has a first trailer inlet valve connection 144.1 and a second trailer inlet valve connection 144.2, wherein the first trailer inlet valve connection 144.1 is connected via an eighth supply pressure line 150 to the third supply pressure line 43 and therefore receives supply pressure pV, in particular from the supply connection 2 of the electropneumatic trailer supply module 1. By providing a sixth switching signal S6, the trailer inlet valve 144 is displaced from the first closed switching position shown in FIG. 6 into the second open switching position not shown in FIG. 6, and a seventh control pressure p7 is selected. The seventh control pressure p7 is provided at a trailer relay valve 154 via a control line 152.

The trailer outlet valve 146 has a first trailer outlet valve connection 146.1 and a second trailer outlet valve connection 146.2, wherein the first trailer outlet valve connection 146.1 is connected to the sixth control line 152, and the second trailer outlet valve connection 146.2 is connected to a sixth venting line 153. The sixth venting line 153 opens into the first venting line 134 and therefore leads to the venting device 5. The sixth control line 152 can be vented via the trailer outlet valve 146, in order to reduce the seventh control pressure p7. For this purpose, the electronic control unit ECU provides a seventh switching signal S7 in order to move the trailer outlet valve 146 from the closed switching position shown in FIG. 6 into the open switching position not shown in FIG. 6.

The trailer relay valve 154, in the same way as the parking brake relay valve 132, has a trailer relay valve control connection 154.1 at which the seventh control pressure p7 is selected via the sixth control line 152. In addition, the trailer relay valve 154 has a trailer relay valve working connection 154.2, a trailer relay valve supply connection 154.3, and a trailer relay valve venting connection 154.4. The trailer relay valve working connection 154.2 is connected to a trailer brake pressure line 156 in which the trailer control pressure pS is selected. Furthermore, the trailer relay valve 154 is connected in a known manner via its trailer relay valve supply connection 154.3 to the eighth supply pressure line 150, or a branch line 157 thereof, in order to be supplied with supply pressure pV, in particular via the supply connection 2. Furthermore, the trailer relay valve venting connection 154.4 is connected in a known manner via a seventh venting line 158 to the first venting line 34 and therefore to the venting device 5.

According to this exemplary embodiment (FIG. 6), the trailer pilot control unit 140 also has the trailer redundancy valve 148. The trailer redundancy valve 148 includes a first trailer redundancy valve connection 148.1 and a second trailer redundancy valve connection 148.2. The first trailer redundancy valve connection 148.1 is connected to a redundancy pressure line 160 which is connected to a redundancy connection 162. A redundancy pressure pR can be modulated at the return connection 162, for example via a pneumatic brake pedal. In other exemplary embodiments, the pressure of a further vehicle axle, for example the front axle, can also be redundantly modulated at the redundancy connection 162 as the redundancy pressure pR. The redundancy pressure pR is used in particular to replace the seventh control pressure p7 in the event that the electronic control unit ECU is not working or is not working correctly. For this purpose, the trailer redundancy valve 148 controls the redundancy pressure pR in a seventh control line 164 which opens into the sixth control line 152 and is therefore able to provide the redundancy pressure pR at the trailer relay valve control connection 154.1.

In customary driving mode, the trailer redundancy valve 148 is energized by means of an eighth switching signal S8, so that it is in the closed switching position not shown in FIG. 6. The redundancy pressure pR is shut out. In the event that the electronic control unit 40 has a fault, the trailer redundancy valve 148 is switched in a currentless manner, such that it falls in the first open switching state shown in FIG. 6 and the redundancy pressure pR at the trailer relay valve control connection 154.1 can be selected.

As a further special feature in this exemplary embodiment (FIG. 6), it is provided that a protection valve 166 is arranged in the trailer brake pressure line 156. A protection valve 166 of this kind is also referred to as a "tractor protection valve" (TPV) and is used to provide the trailer control pressure pS at the trailer control connection 108 only when a supply pressure pA is also provided. To this end, the protection valve 166 is designed to be pneumatically controlled and is connected by a protection valve control line 168 to the supply pressure line 32, so that the trailer supply pressure pA is provided at the protection valve 166 as the third control pressure p3. As soon as the third control pressure p3 exceeds a predefined protection valve threshold value, the protection valve switches into the second switching position which is not shown in FIG. 6 and connects a first protection valve connection 166.1 to a second protection valve connection 166.2, so that the trailer control pressure pS can be selected at the trailer control connection 108. In the event that the third control pressure p3 falls short of the protection valve threshold value, so particularly in the event that no trailer supply pressure pA has been selected, the protection valve 166 switches into the first switching position shown in FIG. 6 so that a selection of the trailer control pressure pS is prevented, irrespective of the switching position of the trailer pilot control unit 140 or of the trailer inlet/outlet unit 142.

In the third exemplary embodiment of the electropneumatic parking brake module 100 (FIG. 7), the difference lies in the trailer control unit 106. The same and similar elements are in turn provided with the same reference numbers and, to this extent, full reference is made to the above description. The differences between the third exemplary embodiment (FIG. 7) and the second exemplary embodiment (FIG. 6) of the electropneumatic parking brake module 100 are discussed in particular below.

The difference between the third exemplary embodiment (FIG. 7) and the second exemplary embodiment (FIG. 6) lies in the fact that no separate protection valve 166 is provided. Nevertheless, in order to prevent a selection of the trailer control pressure pS in the event that no trailer supply pressure pA is selected, the circuit according to the third exemplary embodiment uses a relay valve supply line 170 which branches from the supply pressure line 32 or the feedback line 12. When the supply pressure pA is selected, it is present in both the supply pressure line 32 and in the feedback line 12. In other words, the trailer relay valve 154 receives its supply pressure at the trailer relay valve supply connection 154.3 from the electropneumatic trailer supply module 1, namely only when the supply pressure pA is selected. This also prevents a trailer control pressure pS from being selected when no supply pressure pA can be selected at the trailer supply connection 6. The advantage of this circuit is that the separate protection valve 166 can be dispensed with.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 electropneumatic trailer supply module
2 supply connection
3 first compressed air supply
4 second compressed air supply
5 venting device
6 trailer supply connection
8 pneumatically controlled main valve unit
10 electropneumatic pilot control unit
12 feedback line
13 throttle
14 main valve
14.1 first main valve connection
14.2 second main valve connection
14.3 third main valve connection
14.4 first control connection
14.5 second control connection
16 inlet valve
17 Inlet circuit
18 outlet valve
19 outlet circuit
20 2/2-way inlet valve
20.1 first 2/2-way inlet valve connection
20.2 second 2/2-way inlet valve connection
21 2/2-way outlet valve
21.1 first 2/2-way outlet valve connection
21.2 second 2/2-way outlet valve connection 22 3/2-way inlet valve
22.1 first 3/2-way inlet valve connection
22.2 second 3/2-way inlet valve connection
22.3 third 3/2-way inlet valve connection
24 3/2-way outlet valve
24.1 first 3/2-way outlet valve connection
24.2 second 3/2-way outlet valve connection
24.3 third 3/2-way outlet valve connection
26 first control line
27 second control line
28 select-high valve
30 first supply pressure line
31 second supply pressure line
32 supply pressure line
34 first venting line
35 second venting line
36 connection point
37 measuring line
38 third venting line
40 electrical connection
42 pressure sensor
43 third supply pressure line
48 parking brake pressure line
100 electropneumatic parking brake module
102 parking brake unit
104 spring accumulator connection
105 spring brake cylinder
106 trailer control unit
108 trailer control connection
110 parking brake pilot control unit
112 parking brake inlet/outlet unit
114 bistable control valve
114.1 first bistable valve connection
114.2 second bistable valve connection
114.3 third bistable valve connection
116 third control line
118 fourth venting line
120 parking brake inlet valve
120.1 first parking brake inlet valve connection
120.2 second parking brake inlet valve connection
120.3 third parking brake inlet valve connection
120.4 third control connection
122 parking brake shut-off valve
122.1 first parking brake shut-off valve connection
122.2 second parking brake shut-off valve connection
122.3 fourth control connection
124 3/2-way control valve
124.1 first control valve connection
124.2 second control valve connection
124.3 third control valve connection
126 fourth control line
128 fifth supply pressure line
130 fifth venting line
132 parking brake relay valve
132.1 parking brake relay valve control connection
132.2 parking brake relay valve working connection
132.3 parking brake relay valve supply connection
132.4 parking brake relay valve venting connection
134 sixth supply pressure line
136 2/2-way control valve
136.1 first 2/2-way control valve connection
136.2 second 2/2-way control valve connection
138 sixth supply pressure line
140 trailer pilot control unit
142 trailer inlet/outlet unit
144 trailer inlet valve
144.1 first trailer inlet valve connection
144.2 second trailer inlet valve connection
146 trailer outlet valve
146.1 first trailer outlet valve connection
146.2 second trailer outlet valve connection
148 trailer redundancy valve
148.1 first redundancy valve connection
148.2 second redundancy valve connection
150 eighth supply pressure line
152 sixth control line
153 sixth venting line
154 trailer relay valve
154.1 trailer relay valve control connection
154.2 trailer relay valve working connection
154.3 trailer relay valve supply connection
154.4 trailer relay valve venting connection
156 trailer brake pressure line
157 branch line
158 seventh venting line
160 redundancy pressure line
162 redundancy pressure connection
164 seventh control line
166 protection valve
166.1 first protection valve connection
166.2 second protection valve connection
168 protection valve control line
170 relay valve supply line
ECU electronic control unit
p1 first control pressure
p2 second control pressure
p3 third control pressure
p4 fourth control pressure
p5 fifth control pressure
p6 sixth control pressure
p7 seventh control pressure
pA supply pressure
pF spring brake pressure
pR redundancy pressure
pS trailer control pressure
pV supply pressure
S1 first switching signal
S2 second switching signal
S3 third switching signal
S4 fourth switching signal
S5 fifth switching signal
S6 sixth switching signal
S7 seventh switching signal
SA trailer coupling signal
SD pressure signal

The invention claimed is:

1. An electropneumatic trailer supply module for an electropneumatic parking brake system for a tractor vehicle/trailer combination, the electropneumatic trailer supply module comprising:
a supply connection configured to connect to a compressed air supply;
a trailer supply connection configured to deliver a trailer supply pressure for a trailer vehicle;
a pneumatically controlled main valve unit configured to selectively connect the trailer supply connection to the supply connection or to a venting device;
an electropneumatic pilot control unit configured to deliver at least a first control pressure to the pneumatically controlled main valve unit; and
a feedback line,
wherein the pneumatically controlled main valve unit is configured to connect the trailer supply connection to the supply connection in order to enable the flow of compressed air from the supply connection to the trailer supply connection in the presence of a first control pressure that exceeds a predefined first threshold value, wherein the pneumatically controlled main value unit configured to connect the trailer supply connection to the venting device in the presence of a control pressure that falls below the predefined first threshold value, wherein a selected supply pressure selected by the pneumatically controlled main valve unit can be selected as a second control pressure at the pneumatically controlled main valve unit for the pneumatic maintenance of the selected supply pressure, wherein the feedback line is configured to provide the selected supply pressure to the pneumatically controlled main valve unit via the electropneumatic pilot control unit, and wherein the electropneumatic pilot control unit is configured to connect, in a currentless switching position, the feedback line to the pneumatically controlled main valve unit.

2. The electropneumatic trailer supply module as claimed in claim 1, wherein if the second control pressure exceeds a predefined second threshold value of the pneumatically controlled main valve unit, the switching position is maintained, and wherein if the second control pressure falls short of the predefined second threshold value of the pneumatically controlled main valve unit, the main valve unit switches and the trailer supply connection is configured to be vented.

3. The electropneumatic trailer supply module as claimed in claim 1, wherein the feedback line comprises a throttle.

4. The electropneumatic trailer supply module as claimed in claim 1, wherein the first control pressure and the second control pressure are assigned to a joint control area of the pneumatically controlled main valve unit.

5. The electropneumatic trailer supply module as claimed in claim 1, wherein the pneumatically controlled main valve unit includes a main valve configured as a 3/2-way valve with a first main valve connection connected to the supply connection, a second main valve connection connected to the trailer supply connection, a third main valve connection connected to a venting device, and a first control connection, at which the first control pressure is configured to be delivered, connected to the pilot control unit.

6. The electropneumatic trailer supply module as claimed in claim 5, wherein the second control pressure is configured to be delivered to the first control connection or the main valve further comprises a second control connection at which the second control pressure is configured to be delivered.

7. The electropneumatic trailer supply module as claimed in claim 6, wherein the feedback line is directly connected to the first control connection or to the second control connection.

8. The electropneumatic trailer supply module as claimed in claim 1, wherein the electropneumatic pilot control unit has an inlet valve and an outlet valve, each of the inlet valve and the outlet valve being connected to at least one control port of the pneumatically controlled main valve unit.

9. The electropneumatic trailer supply module as claimed in claim 8, wherein the inlet valve is assigned to an inlet circuit and the outlet valve is assigned to an outlet circuit, and wherein the inlet circuit and the outlet circuit are pneumatically connected.

10. The electropneumatic trailer supply module as claimed in claim 8, wherein the inlet valve is assigned to an inlet circuit and the outlet valve is assigned to an outlet circuit, and wherein the inlet circuit and the outlet circuit are separate.

11. The electropneumatic trailer supply module as claimed in claim 8, wherein the inlet valve is a 2/2-way inlet valve.

12. The electropneumatic trailer supply module as claimed in claim 11, wherein the 2/2-way inlet valve has a first 2/2-way inlet valve connection connected to the supply connection and a second 2/2-way inlet valve connection connected to the pneumatically controlled main valve unit.

13. The electropneumatic trailer supply module as claimed in claim 8, wherein the inlet valve is a 3/2-way inlet valve.

14. The electropneumatic trailer supply module as claimed in claim 13, wherein the 3/2-way inlet valve has a first 3/2-way inlet valve connection connected to the supply connection, a 3/2-way inlet valve connection connected to the main valve unit, and a third 3/2-way inlet valve connection connected to the venting device.

15. The electropneumatic trailer supply module as claimed in claim 8, wherein the outlet valve is a 2/2-way outlet valve.

16. The electropneumatic trailer supply module as claimed in claim 15, wherein the 2/2-way outlet valve has a first 2/2-way outlet valve connection connected to the main valve unit and a second 2/2-way outlet valve connection connected to the venting device.

17. The electropneumatic trailer supply module as claimed in claim 8, wherein the outlet valve is a 3/2-way outlet valve.

18. The electropneumatic trailer supply module as claimed in claim 17, wherein the 3/2-way outlet valve has a first 3/2-way outlet valve connection connected to the venting device, a second 3/2-way outlet valve connection connected to the main valve unit, and a third 3/2-way outlet valve connection connected to the trailer supply connection.

19. The electropneumatic trailer supply module as claimed in claim 12, wherein the second 2/2-way inlet valve connection or a second 3/2-way inlet valve connection and a second 3/2-way outlet valve connection or a first 2/2-way outlet valve connection are connected to a joint control line which is in turn connected to the main valve unit so that both the first and the second control pressure are configured to be selected at the main valve unit.

20. The electropneumatic trailer supply module as claimed in claim 1, further comprising an electronic control unit with an electrical connection configured to receive trailer coupling signals and/or to provide corresponding switching signals at least to the pilot control unit.

21. The electropneumatic trailer supply module as claimed in claim 1, further comprising a pressure sensor configured to detect the supply pressure and a corresponding pressure signal.

22. The electropneumatic trailer supply module as claimed in claim 21, wherein the pressure signal is provided for electropneumatic trailer identification and/or plausibility checking of a further trailer identification.

23. An electropneumatic parking brake module, comprising:
a parking brake unit,
at least one spring accumulator connection for connecting at least one spring brake cylinder, and
the electropneumatic trailer supply module as claimed in claim 1,
wherein the parking brake unit is configured to receive a second supply pressure from the supply connection.

24. The electropneumatic parking brake module as claimed in claim 23, further comprising:
- a trailer control unit with a trailer control connection configured to select a trailer control pressure which is provided to effect an actuation of service brakes of the trailer vehicle,
- wherein the trailer control unit is configured to receive a second supply pressure from the supply connection and to receive the supply pressure as the third control pressure.

* * * * *